Feb. 9, 1960 L. G. BARRY 2,924,671
HANDSET HOLDERS
Filed Sept. 11, 1957

INVENTOR
Leon G. Barry
BY
Watson, Cole, Grindle & Watson
ATTORNEYS

United States Patent Office 2,924,671

Patented Feb. 9, 1960

2,924,671

HANDSET HOLDERS

Leon G. Barry, Charlottesville, Va., assignor to United States Instrument Corporation, Charlottesville, Va., a corporation of New Jersey Application September 11, 1957, Serial No. 683,301

4 Claims. (Cl. 179—146)

This invention relates to holders for telephone handsets, and more particularly to an improved handset holder for use in locations which are especially subject to shock and vibration, such as trains, ships, motor vehicles, and the like.

The invention has for its general object the provision of a simple, inexpensive, and easily fabricated handset holder which is adapted to engage a telephone handset in a resilient but positive manner, so as to prevent dislodgment of the handset from the holder by reason of even relatively severe shocks. A further object is the provision of such a holder which is adapted, at the same time, to prevent the entry of foreign matter into the telephone mouthpiece when the handset is not in use.

More specifically, it is an object of the present invention to provide a holder for a telephone handset, comprising a continuous length of spring wire shaped to form a frame which frame, at its upper end, is formed to provide a cradle for the receiver portion of the handset, said frame having parallel side members extending downwardly from the cradle and terminating in end portions extending horizontally toward each other to form trunnions for a solid body which is rotatably mounted on and between said trunnions, the said frame being so dimensioned that the solid body is spaced from the cradle by a distance corresponding roughly to the length of the handset, the solid body being of a size slightly larger than the opening in the cupped mouthpiece of the transmitter portion of the handset, whereby the body is adapted to close said opening and prevent the entry of foreign material thereinto; the side members being so formed and dimensioned that, when a handset receiver is supported in the cradle portion of the holder, and the transmitter portion of the handset is moved into contact with the said solid body, the frame of the holder is slightly shortened by flexure of the side members, thus enabling the solid body partially to enter, and wholly obstruct, the said mouthpiece opening with a resilient snap or detent action.

A further object is the provision of a handset holder as described in the preceding paragraph, in which the frame side members are so formed as to provide, at either side of said solid body and extending therebeyond, guide members spaced to receive therebetween the transmitter portion of a handset. Another object is the provision, in a handset holder of the type described, a cross member engaging and extending transversely between the frame side members which cross member prevents the side members from spreading and is also formed to provide means for affixing the holder to an external support.

Other and further objects, features and advantages will be apparent from the description which follows, read in connection with the accompanying drawings in which Figure 1 is a side elevational view of a handset holder according to the invention, a telephone handset being shown in broken lines;

Figure 1:
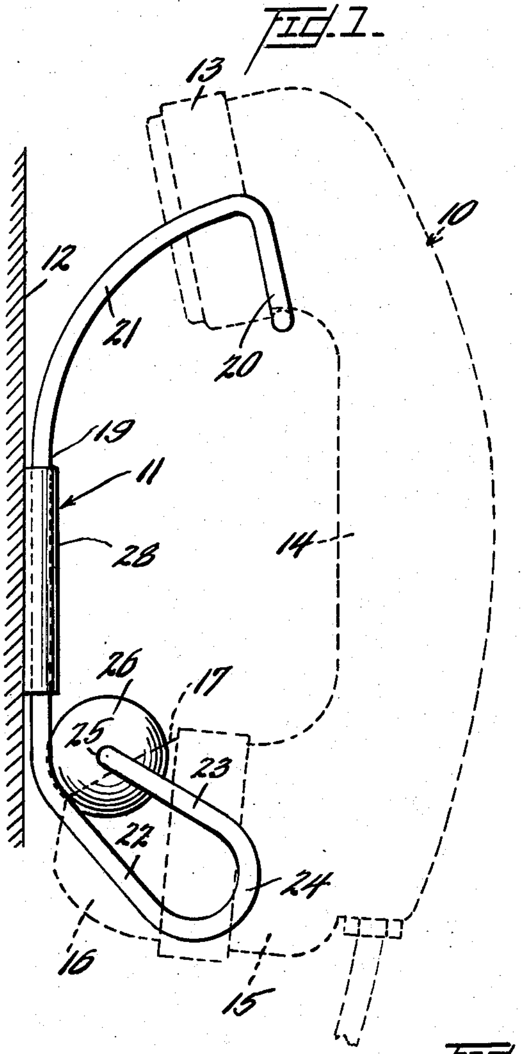

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring now to the drawings, a telephone handset 10, shown in broken lines, is seen as supported and engaged by a holder 11 which in turn is secured to an external support 12, which may be any suitable surface of a train, ship, vehicle, or other structure. The handset is conventional and comprises a receiver portion 13, a handle portion 14 and a transmitter portion 15, the latter being fitted with a mouthpiece 16. The mouthpiece 16 is cupped and shaped in a manner to improve acoustic pick-up of voice when in use, but to exclude as far as possible external noises, said mouthpiece having an opening, preferably but not necessarily circular, in its upwardly facing portion 17, for admission of voice-induced sound waves to the transmitter proper.

Figure 2:
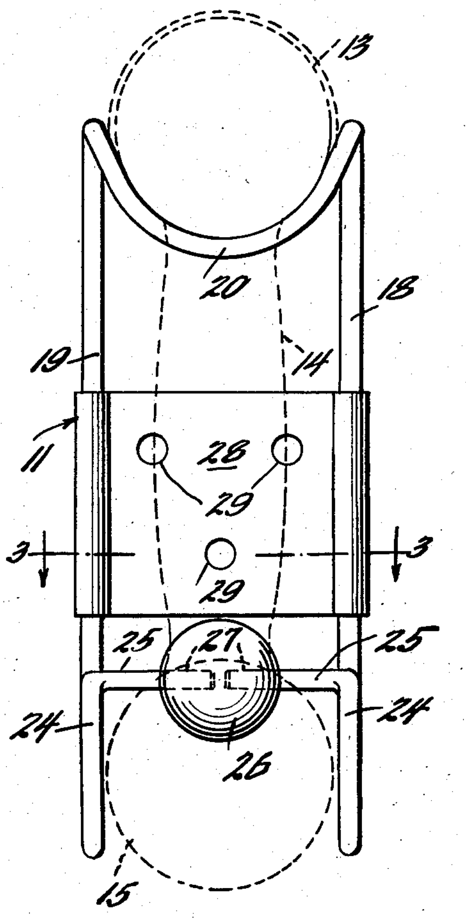
Figure 2 is a front elevation of the device seen in Figure 1.
Figure 3:
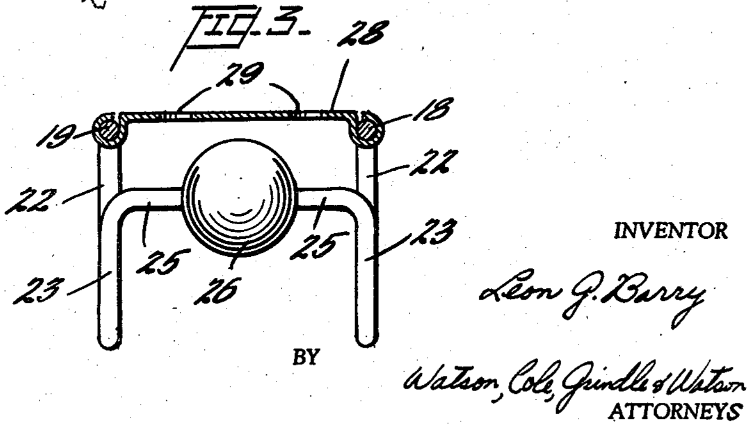
Figure 3 is a sectional view taken on line 3—3 of Figure 2.

The holder 11 of the present invention comprises a continuous length of resilient material, for example spring wire, bent to form a vertically-disposed frame which, in front view (Figure 2) is symmetrical about its vertical axis. The frame comprises generally two parallel side members 18 and 19 connected at their upper end by a transverse member 20 which is curved generally in the form of a semi-circle to provide a cradle for the receiver portion of a handset. The side members 18 and 19 are curved to a greater or lesser extent, as indicated at 21 in Figure 1, to provide the required resiliency to permit the holder to perform in the manner hereinafter described.

At the lower ends of the respective side members 18 and 19, the frame is bent forwardly as at 22 and then rearwardly as at 23 to form substantially U-shaped guide members 24 for the purpose hereinafter mentioned. At the rearward ends of the respective portions 23, the free ends of the material forming the frame are bent horizontally toward each other to form the axially aligned portions 25 which serve as trunnions for a solid body 26 rotatably mounted thereon. The body 26 is provided with opposite bores 27 to receive the trunnions 25, which bores are almost, but not quite, intersected. The body 26 can freely rotate, and may have slight transverse movement, upon the trunnions 25. It is, of course, installed upon the trunnions 25 by spreading the side members 18 and 19 by flexure. After the body 26 is installed upon the trunnions 25, a cross member 28, for example of sheet metal, is affixed to and between the side members 18 and 19 to maintain them in parallelism, and preferably the cross member 28 is provided with means such as the apertures 29 to facilitate securing the holder to a supporting surface such as indicated at 12 in Figure 1.

In the case of a circular opening in the portion 17 of the transmitter mouthpiece 16, the body 26 is suitably spherical and of slightly larger diameter than that of said circular opening. In the event that the mouthpiece opening is of a different shape, for example oval or oblong, the body 26 may be of a corresponding three-dimensional shape, always of such size as to permit it to enter to a substantial depth into the said mouthpiece opening, thereby closing the opening, but not to pass through the opening.

When a telephone handset of the type illustrated is to be engaged with the holder of the present invention, the receiver portion 13 is placed in the cradle portion 20 of the holder. A moderate downward and rearward force is then exerted upon the transmitter portion of the handset, causing flexure of the side members 18 and 19 and thus slightly shortening the vertical length of the holder. This enables the body 26 to snap over the adjacent edge of the opening in the mouthpiece 16, so that it acts as a resilient detent maintaining the handset in positive though resilient engagement with the holder. During this movement, the frame portions 22, 23 and 24 on either side of the holder serve as guide members to guide the transmitter so as to bring the mouthpiece opening into registration with the body 26. To remove the handset from the holder, the operation is reversed.

From the foregoing description it will be apparent that the present invention provides a holder for telephone handsets, having notable advantages over those now in use and which attains the objects set forth at the outset hereof.

Having thus described the invention, what is claimed as new and desired to be secured by Letters Patent is:

1. A holder for a telephone handset having a receiver portion and a transmitter portion, said transmitter portion having a mouth-piece, comprising a resilient frame shaped at its upper end to provide a cradle for the receiver portion of said handset, said frame having parallel curved side members extending downwardly from said cradle and terminating in end portions extending horizontally toward each other, said end portions forming trunnions, a body rotatably mounted on and between said trunnions and spaced from said cradle by a distance slightly less than the distance between the receiver and transmitter of said handset, said body being of a size to fill the opening of said mouthpiece and said spacing being such that said frame is slightly shortened by flexure when said handset receiver is hung in said cradle and said transmitter mouthpiece is moved transversely to engage the said opening over said body, whereby said engagement is effected with a resilient snap action.

2. The device defined in claim 1, said body being substantially spherical.

3. The device defined in claim 1, including a cross-member engaging and extending transversely between said side members, said cross-member being formed to provide means for affixing said holder to an external support.

4. The device defined in claim 1, said side members being bent at their lower ends to provide, at either side of said body and extending therebeyond, guide members spaced to receive said transmitter therebetween.

References Cited in the file of this patent

UNITED STATES PATENTS

| | | |
|---|---|---|
| 2,036,010 | Atkins | Mar. 31, 1936 |
| 2,188,958 | Richardson et al. | Feb. 6, 1940 |
| 2,351,125 | Henrikson | June 13, 1944 |
| 2,355,464 | Obergfell | Aug. 8, 1944 |
| 2,428,091 | Obergfell | Sept. 30, 1947 |
| 2,639,334 | Fleming | May 19, 1953 |